July 13, 1954

F. E. McLANE ET AL 2,683,847

ELECTRICAL CONTROL SYSTEM

Filed March 11, 1952

WITNESSES:
Robert C. Baird
E. F. Oberlin

INVENTORS
Fletcher E. McLane &
John M. Cochran.
BY
Paul E. Friedemann
ATTORNEY

Patented July 13, 1954

2,683,847

UNITED STATES PATENT OFFICE 2,683,847

ELECTRICAL CONTROL SYSTEM

Fletcher E. McLane, Lancaster, and John M. Cochran, Buffalo, N. Y., assignors to Westinghouse Electric Corporation, East Pittsburgh, Pa., a corporation of Pennsylvania Application March 11, 1952, Serial No. 275,968

18 Claims. (Cl. 318—331)

This invention relates generally to electrical control systems, and more in particular to electrical systems for controlling the speed of a motor.

The invention is herein illustrated as a system for controlling the speed of rotation of a direct current motor, wherein electric discharge devices such as vacuum tubes and gas filled tubes are utilized respectively in the speed error detecting circuits and the motor terminal voltage control circuits for controlling the speed of the motor. It is to be understood however, that such an arrangement is only illustrative of one method of practicing this invention, since other types of amplifying or control devices such as rotating dynamo electric machines, magnetic amplifiers and saturable reactors may be utilized in place of the particular amplifiers herein employed.

The principle of motor speed regulation herein employed, utilizes the counter E. M. F. of the motor for indicating motor speed. As is well-known, such a voltage is not accurately indicative of motor speed since the voltage thus produced includes a component of voltage due to the resistance of the motor armature winding. This is generally referred to as the IR drop and it is generally recognized that this IR drop component must be eliminated from the armature terminal voltage in order to have a voltage approaching an indication of the actual speed of the motor.

However, simple counter E. M. F. regulators of the type herein described under certain operating conditions permit errors in speed regulation which in some instances are not acceptable. One of the attributes of an electronic type of speed regulator is the rapid rate of response to speed error and the ability of such regulators to maintain a regulated speed within fairly close limits. Thus, the introduction of errors by means of a voltage not accurately indicative of motor speed may in some instances prove detrimental.

It has been found through careful analysis of systems which regulate in dependence of motor counter E. M. F. that in the speed range obtained by armature voltage control, the motor terminal voltage may be considered to be made up of three distinct parts, in which case the expression for armature terminal voltage may be written as: $Ea = KN + IR + K'NI$.

This means that the armature voltage is the sum of the generated counter E. M. F. ($KN$) the ($IR$) drop and a third term ($K'NI$) which expresses the fact that a voltage is present which is proportional to both the motor current and the motor speed.

Thus, apparently, to obtain good speed regulation, the last two terms of the above expression must be eliminated so that the counter E. M. F. voltage ($KN$) which is proportional to speed will be the only voltage which is applied to the regulating circuits. As noted earlier in these remarks, the ($IR$) term may be cancelled conveniently by developing an auxiliary voltage signal proportional to the IR drop of the motor and subtracting this voltage from the armature voltage ($Ea$) before applying it to the regulator circuits. The third term ($K'NI$) can only be completely eliminated by careful motor design. It appears that this term exists because the demagnetizing ampere turns of armature reaction are not exactly cancelled by the combined effects of the series and commutating fields of the motor. Tests which have been made on a variety of motors indicate in general that the magnetizing ampere turns due to the series and commutating fields will be greater than the demagnetizing ampere turns due to the armature reaction. This indicates that the flux in the active air gap of the motor increases with increasing armature current.

The increase in flux in the gap as the motor is loaded has one effect on motor speed at low speeds. This is usually of a lower order than the effect at high speed because the conductors in the armature are cutting this increase in flux ($\Delta\phi$) at very slow speed. It will be appreciated, however, that at top speed of the motor that the flux will change with increasing motor armature current by approximately the same ($\Delta\phi$), but in this case, the conductors of the armature cut this flux at a higher rate. From this it will be seen that for the same change in flux ($\Delta\phi$) a very significant voltage term ($K'NI$) which is proportional to the product of motor speed and armature current is produced.

The effect of this third term is most important on regulation at top speeds. If IR compensation is adjusted in the average counter E. M. F. type of regulator, until the no-load and full-load motor speeds are the same at minimum speed, and thereafter the speed control potentiometer is turned to top speed and the no-load and full-load motor speeds are compared, it is found in general, that the motor speed tends to droop as load is applied. In some systems, this speed droop may amount to 6 to 8%. This droop, as explained above, is due to the change in flux in the gap of the motor and no amount of gain in the regulating loop will reduce the speed droop appreciably.

Although it has been noted herein that the third term of the above expression may be eliminated completely only by the proper design of the motor in such a way that the effect of demagnetizing armature reaction alone is exactly cancelled by the series and commutating fields, it is feasible that this condition may be compensated, if not completely, at least to an appreciable extent, with some form of compensation in the regulating circuits corresponding to IR drop compensation, but arranged to be additionally proportional to speed.

Tests have indicated that such an approach to the problem is feasible and can be accomplished in a relatively simple manner. These tests have also indicated that this form of compensation is primarily effective over a speed range of the motor obtained by controlling the armature terminal voltage. In many instances, it is necessary to operate a motor over a speed range higher than that normally obtainable with armature voltage regulation alone. The practice in this case is to reduce field excitation after the maximum speed range by armature voltage variation has been achieved.

When the flux in the motor gap is reduced by weakening the shunt field or separately excited field excitation, the previously described change in flux ($\Delta\Phi$) becomes a much larger percentage of the total. Under these conditions, major speed changes with increasing load usually result. The change in flux ($\Delta\Phi$) over the range of motor speeds obtained by armature voltage regulation results in a voltage which may be considered to vary substantially linearly with speed. However, over that range of speeds obtained by variation of the excitation of the separately excited motor field, the relationship becomes non-linear and may require compensation in non-linear circuits.

The circuity whereby compensation for the unwanted components of motor armature terminal voltage may be obtained, in counterelectromotive force regulating systems, may take on a variety of forms. Several of these are described hereinafter and illustrated in the accompanying drawings. Although various approaches to this problem may exist, these have a common foundation which is, namely, a response to motor current which is a measure of IR compensation. Impedance circuits can, therefore, be devised to combine a plurality of voltages, derived primarily in dependence of operating quantities of the motor to be controlled, in such a way as to provide a control voltage which will accurately regulate motor speed.

According to this invention provision is made for varying a control quantity derived as a function of motor current, in dependence of motor speed. A compensating arrangement incorporating a feature such as this inherently compensates the unbalanced ampere turns between the demagnetizing ampere turns of armature reaction and the magnetizing ampere turns due to the series and commutating fields, to measurably improve regulation for a selected motor speed.

However, in the adjustment of the compensating circuity to achieve regulation of speed over the speed range, other system variables due, for example, to the load of the motor on the line and the characteristics of the specific control system, if of a substantially linear nature in their effect on motor speed, are also compensated. This will be appreciated from the following general considerations: When the motor is connected to the line, the line voltage tends to drop. Additionally, line voltage will tend to vary with variable loading of the motor. This variation of line voltage with varying motor load appears as a change in voltage across the armature terminals of the motor tending to permit speed droop with increasing load for a particular speed setting. This, of course, results in an unbalance between the selected speed voltage and the component of speed voltage in the armature terminal voltage tending to correct or hold the motor speed at the selected speed.

But in the systems herein disclosed provision is made for calibration wherein for a minimum speed setting compensation is introduced to hold the motor minimum speed constant over the load range from no load to full load and for calibration at the maximum speed setting wherein compensation is introduced tending to hold the motor maximum speed constant over the load range from no load to full load. Thus the minimum and maximum speed compensating magnitudes tending to provide flat speed regulation under variable load conditions are produced. By varying the compensating magnitude as a function of speed setting, it will be appreciated that flat speed characteristics of the motor over the speed range are obtainable because the variable, line voltage, reflected in a varying armature terminal voltage is compensated in the calibration.

In an analogous way the characteristics of the control system may be compensated in the calibration. Considering, for instance, the characteristic of an electronic type of motor armature voltage control in which grid controlled, gas filled rectifiers are utilized to control armature current and voltage, tests indicate that over the speed range the amount of grid voltage change required to hold motor speed constant over the load range increases as the speed increases. This is due primarily to the combined effects of the plate and grid characteristics of such a tube functioning as a low gain amplifier in which the plate voltage swings into its more non-linear range approaching maximum plate voltage. These two effects approach linearity and may be successfully compensated in the circuity herein provided. Such compensation is automatically included in the speed compensating adjustments described above.

On the basis of the foregoing brief summary of the problem and general indications of possible solutions to this problem, it is an important object of this invention to provide a simple counter E. M. F. regulator for a motor which is capable of maintaining motor speed within very accurate limits over a given load range.

Further to the preceding object, it is an object of this invention to provide a simple counter E. M. F. speed regulator for a motor which compensates motor variables, system variables and line voltage droop due to motor load, to hold motor speed substantially constant over a given load range.

More specifically, it is an object of this invention to provide a counter E. M. F. motor speed regulator wherein a compensating voltage proportional to both motor speed and armature current is utilized to regulate motor speed.

Still more specifically, it is an object of this invention to provide a simple counter E. M. F. regulator for a motor wherein the motor armature terminal voltage is compared with a selected reference voltage to regulate motor speed and in which a voltage proportional to IR drop and a voltage proportional to both the motor speed and motor armature current are utilized as compensating voltages in the regulating loop.

The foregoing statements are merely illustrative of the various aims and objects of this invention. Other objects and advantages will become apparent from a study of the following disclosure when considered in conjunction with the accompanying drawings, in which:

Figure 1:
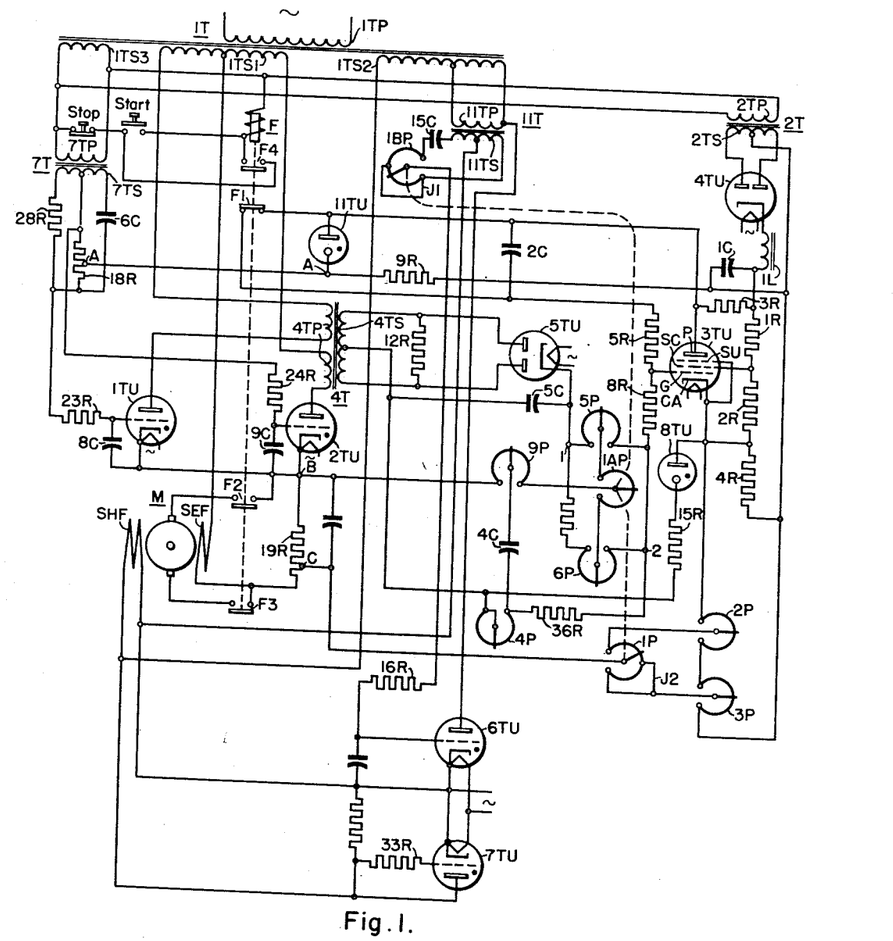
Fig. 1 is a schematic diagram illustrating one embodiment of this invention.

In the circuit illustrated in Fig. 1, a fairly complete showing of a control system for controlling the speed of a direct current motor designated M in one direction of rotation is illustrated. Any type of direct current motor may be controlled. The motor shown is of the series type having a series field winding SEF. This system is of the electronic type and utilizes a pair of gas-filled triodes such as thyratrons designated ITU and 2TU in a single-phase full wave rectifying scheme for controlling the motor armature terminal voltage and, hence, the current supplied to the motor, in order to control the motor speed over a variable range of speeds by armature voltage regulation and, over a further range of speeds, by means of motor field voltage regulation. Systems of this general type are well-known to the art, and it is to be understood that the present invention is not limited in any respect to a single phase full wave system, but may, for example, be also applied in two-phase full wave applications and various other three-phase and multi-phase rectifier control applications.

In the specific system herein illustrated, the power supply for the system is represented in a main transformer generally designated IT, comprising a primary winding ITP and a plurality of secondary windings of which the secondary winding ITS1 is utilized as the source of energizing voltage for the main rectifier portion of the system. To this end the plates of the respective tubes ITU and 2TU are connected to opposite ends of the transformer secondary winding ITS1 and the cathodes of these tubes are connected through the motor armature circuit to a mid tap on this secondary winding. The circuit from the cathodes of the respective tubes is controlled by a contactor designated F which is energized from a secondary winding of the main transformer designated ITS3. This circuit is controlled by the Start and Stop push buttons. This contactor includes a plurality of contacts. The contact designated F1 is closed when the contactor is deenergized. This is utilized in the system for a purpose to be described at a later point in this description. The normally opened contacts F2 and F3 are arranged in series in the motor circuit and are closed upon energization of the contactor in order to establish the circuit for the armature of the motor. The contact F4 is connected in shunt with the Start push button and, therefore, provides a circuit for energizing the coil of contactor F after the contactor is closed and the Start push button is released.

The grid circuits for the main rectifiers ITU and 2TU are controlled by an alternating current voltage which is shifted in phase by about 90 to 100° from the plate voltage and the actual firing angle of the respective tubes is controlled by a voltage derived in part from the motor armature terminal voltage which appears across a resistor 19R connected across the motor terminals. This voltage which is compensated for IR drop and for variations in terminal voltage in dependence of speed and armature current, to be hereinafter deescribed, is applied to the grids of the main rectifiers to control the firing angle of these tubes and thus control the speed of the motor.

The alternating current grid voltage is derived in a phase shifting circuit energized by a transformer 7T, the primary 7TP of which is energized by the output of the secondary winding ITS3. The secondary winding 7TS of transformer 7T is connected to the phase shift circuit comprising a resistor 28R connected to one side of the secondary winding 7TS and a capacitor 6C connected to the other side. A resistor 18R is connected between a center tap of winding 7TS and the common terminals of resistor 28R and capacitor 6C. The control grid of tube ITU is connected to this common terminal and the control grid of tube 2TU is connected to the center tap of the winding 7TS. These connections respectively extend through grid resistors 24R and 23R. These respective grids are further connected to the respective cathodes by means of capacitors 8C and 9C in accordance with conventional practice.

The speed error voltage for controlling the main rectifiers is obtained in a circuit including a control tube 3TU. This tube may be of any suitable type. A pentode is shown and includes a plate designated P, a suppressor grid SU which is directly connected to the cathode CA, a screen grid SC and a control grid G. Energizing voltage for this tube is derived from a transformer 2T, having a primary winding 2TP which is energized by the output of secondary winding ITS3 and a secondary winding 2TS which is connected to energize a conventional double-diode type of rectifier designated 4TU to obtain full wave rectification. The output of tube 4TU is filtered in a circuit including an inductor IL and a capacitor IC connected in series across the output thereof.

The plate circuit of control tube 3TU may be traced from the cathode of tube 4TU through inductor IL, through plate resistor 3R of tube 3TU to the anode thereof. From the cathode of tube 3TU this circuit may be traced through one branch extending through resistor 4R to the center tap of secondary winding 2TS or through a second branch including potentiometers 2P and 3P to the mid tap of secondary winding 2TS. The screen grid of tube 3TU is connected to a voltage divider circuit across the filtered output of tube 4TU which includes resistors IR and 2R, to provide the proper screen grid potential.

As earlier noted in this discussion, the motor armature terminal voltage appears across the resistor 19R, a tapped portion of which, at point C, is introduced in the grid circuit of the tube 3TU to provide an indication of the armature terminal voltage in the regulating loop. To obtain an indication of motor armature current for IR drop compensation, a transformer 4T is utilized. This transformer is provided with a pair of identical primary windings, both of which are designated 4TP. These primary windings are connected respectively in the plate circuits of the respective main rectifiers ITU and 2TU. The secondary of this current detecting transformer is designated 4TS and is connected in energizing circuit relation with a conventional double-diode type of rectifier 5TU and load resistor 12R to provide full wave rectification of the current indicating secondary voltage of transformer 4T. The output of this last named double-diode is filtered by a capacitor designated 5C.

It will be appreciated that IR compensation may be achieved by passing a current proportional to motor armature current through a suitable electrical impedance device such as a resistor and utilizing the resistor voltage, or a portion of such voltage, in the regulating loop in opposition to the voltage developed across a resistor such as 19R, to compensate the terminal voltage for the IR drop. However, in the situation herein described, compensation is also to be achieved in dependence of both motor speed and motor armature current in order to minimize the drooping speed characteristic with load as the motor speed is increased.

In accomplishing this, it is found convenient, in effect, to derive the IR compensating voltage and the speed-current compensating voltage in a single network which is energized in dependence of motor current. To this end a simple bridge circuit comprising potentiometers 6P and 5P having input terminals 1 and 2 is utilized. These terminals are connected across the output of the rectifier 5TU in a circuit including a resistor 36R and a rheostat 4P disposed in series around the loop. A third potentiometer 1AP is connected between the taps of respective potentiometers 5P and 6P. This potentiometer and its tap form part of the grid circuit for controlling the tube 3TU, and the voltage herein developed are applied in series in this circuit in opposition to the voltage developed across the motor armature terminal resistor 19R.

The motor armature terminal voltage may be varied to vary motor speed by adjustment of the tap of a potentiometer designated 1P. The end points of this potentiometer are connected to the respective taps of the potentiometers 2P and 3P forming part of the load circuit of the double-diode rectifier 4TU, as previously described. This arrangement is such that a voltage is developed across the potentiometer 1P providing a range of minimum and maximum armature terminal voltages, the actual minimum and maximum voltages depending upon the setting of the respective taps thereof. Thus, by adjusting the tap of potentiometer 1P upwardly as viewed, the tap is moved towards a point of minimum armature voltage determined by the setting of the taps of potentiometer 2P. At the other end of the potentiometer 1P a region over which maximum armature voltage may be applied is reached and this corresponds to the setting of the tap of potentiometer 3P. The voltage which is tapped from potentiometer 1P is applied in the loop in the same sense as the voltage derived from the potentiometer network including potentiometers 5P, 6P and 1AP, and is therefore also in opposition to the voltage appearing across the resistor 19R.

The grid circuit for the tube 3TU may now be traced. This circuit extends from the cathode CA of the tube through a tapped portion of the potentiometer 2P to the tap of potentiometer 1P, to the tap of resistor 19R and through the tapped portion of the resistor to the point B at the cathode of tube 3TU through an anti-hunt potentiometer 9P to the tap of potentiometer 1AP, thence through parallel branches including the right hand tapped portions of potentiometers 5P and 6P to the resistor 8R and the control grid G of the tube 3TU. From this consideration of the grid circuit connection, it will be appreciated that the several voltages developed around the loop are applied in the grid circuit.

The third term (K'NI) of the expression of motor armature terminal voltage hereinabove set forth is obtained in this circuit in the form of a motor current derived compensation which is variable with speed of the motor. This is accomplished by mechanically connecting the tap of potentiometer 1AP to the tap of potentiometer 1P so that upon adjustment of the tap at potentiometer 1P to obtain a variation in motor speed, the tap of potentiometer 1AP is correspondingly moved to introduce a different value of voltage in the control grid circuit of tube 3TU. Since the potentiometer 1AP is energized by a current proportional to motor armature current and since the tap is adjusted in dependence of a selected motor speed for which regulation is to be obtained, it will be appreciated that the factors for the third term of this expression exist in the tapped voltage.

The specific manner whereby the network including potentiometers 5P and 6P is adjusted for achieving this variable compensation voltage is as follows: Assuming that the system is operating, the operator first moves the tap of speed potentiometer 1P to its minimum speed position. Thereafter the minimum speed compensation potentiometer 5P is adjusted until the no-load speed and the full-load speed of the motor at the minimum speed setting are essentially the same. After this adjustment has been made and the tap of potentiometer 5P set as described, the operator then moves the tap of the speed potentiometer 1P to the maximum speed position, and thereafter adjusts the tap of the maximum speed compensation potentiometer 6P so that the no-load and full-load motor speeds are the same at maximum speed. In the event that the minimum speed is a significant fraction of the maximum speed, it may at times be necessary to make a resetting of the tap of potentiometer 5P, in the manner described above for the first adjustment, after the preceding adjustments have been made. Since the taps of the respective potentiometers 5P and 6P have been adjusted to achieve suitable compensation at minimum speed and maximum speed respectively, the position of the tap of potentiometer 1AP at any point corresponds to a particular motor speed and the voltage at that point represents the compensation, proportional to both speed and armature current, which is required. The setting of potentiometer 1AP is coordinated with that of 1P by mechanically connecting the tap of the former with the latter to be moved when the speed potentiometer is adjusted. Thus, the motor variable due to the change in flux ($\Delta\phi$) aforesaid is compensated. But as earlier described this adjustment also compensates such magnitudes of line voltage drop due to motor load and other linear system variables as are present during the calibrating operation.

The output voltage of the tube 3TU is utilized to control the firing angle of the main rectifiers 1TU and 2TU for the purpose of controlling the speed of the motor. The energizing circuit for the tube 3TU extends from the cathode of power supply tube 4TU through inductor 1L and load resistor 3R for tube 3TU to the plate P thereof. From the cathode of tube 3TU the circuit extends through resistor 4R to the center tap of secondary windings 2TS which completes the energizing circuit. As earlier explained in these remarks, the grids of the main rectifiers are controlled with an alternating current voltage which is shifted in phase in the order of 90° to 100° with respect to the plate voltage of the main rectifiers. The D. C. grid biasing circuit for the main rectifiers may be traced from the common cathode point B of the main rectifiers through the armature terminal resistor 19R to the tap of potentiometer 1P. From this point, the circuit extends to the tap of potentiometer 2P and a parallel branch extends to the tap of potentiometer 3P. The circuit then continues through resistors 2R and 1R through the plate load resistor 3R of control tube 3TU through voltage regulator tube 11TU to the tap A on resistor 18R in the phase shift circuit energized by transformer 7T. The circuit then may be traced through parallel branches from tap A through the tapped portions of resistor 18R to the respective grid resistors 23R and 24R of the tubes 1TU and 2TU, respectively, to complete the grid circuits.

From an examination of this grid circuit, it will be observed that the variation in voltage across the resistor 3R in the plate of tube 3TU will vary with the degree of conduction of this control tube. When the conduction is a minimum value, the plate voltage will be a relatively high value and when the tube conduction is a maximum value, the plate voltage will be some relatively lower value corresponding to the degree of conduction, which in turn is controlled by the several voltages which are combined in the control grid circuit of this tube. The plate voltage of control tube 3TU is applied to the grids of the main rectifier tubes through a voltage divider circuit including the voltage regulator tube 11TU and the resistor 9R which are connected between the plate of control tube 3TU and the negative terminal of the power supply of tube 4TU. The plate voltage of the control tube is therefore effectively applied to the end of the resistor 9R which is connected to the cathode of the voltage regulator tube across the constant voltage drop of voltage regulator tube 11TU. Thus, the plate voltage variation appears as a voltage variation solely across the resistor 9R and as a consequence the potential of point A varies essentially with the plate voltage of the control tube. This voltage which appears at point A of resistor 18R is therefore used to shift the grid bias of the main rectifiers in such sense as to control the speed of the motor.

From this, it will be seen that when the conduction of tube 3TU is a minimum value and its plate voltage some correspondingly high value, the potential of point A, for example, will tend to increase with respect to the potential of point B at the cathodes of the main rectifiers. Thus, a control is afforded tending to make the grids of the main rectifiers more positive with respect to their cathodes to cause these tubes to fire at an early point on their respective control cycles, thus increasing the voltage and current supplied to the armature winding of the direct current motor M. On the other hand, as the conduction of the tube 3TU increases, and the plate voltage drops, the potential of point A tends to become less positive or more negative with respect to the potential of point B at the cathodes of the main rectifiers. This causes the tubes to fire at a later point on their operating or control cycles and as a consequence cuts down the voltage and current to the motor M tending to reduce the motor speed.

It is feasible with the circuit hereinabove described to afford an additional control over the direct current motor M to effectively limit the magnitude of motor armature current to a predetermined value so that at no time will there be a danger of damaging the motor or the associated electronic components controlling the motor by excessive current during starting or at times of high overload.

In this circuit, this objective is accomplished through the connection of a tube 8TU to be energized in dependence of motor load current in a circuit from the anode of tube 8TU to the tap of potentiometer 1P, to the tap of resistor 19R, to point B at the cathode of tube 2TU through anti-hunt potentiometer 9P to the tap of potentiometer 1AP, through the tapped portions of potentiometers 1AP, 5P and 6P to the cathode of rectifier 5TU and then from the center tap of secondary winding 4TS through resistor 15R to the cathode of tube 8TU. Whenever the voltage around this loop, due to excessive armature currents reaches and/or exceeds the break-down voltage of voltage regulator tube 8TU, the tube begins to conduct. When the voltage regulator tube conducts current, current is caused to flow through anti-hunt potentiometer 9P, which is of high ohmic value and does not normally carry current since there is no control grid current in tube 3TU. The voltage drop now appearing across potentiometer 9P due to conduction of regulator tube 8TU now drives control grid G more positive which through the previously described control reduces conduction of the main rectifiers.

If, for example, in starting the system, the Start push button is pressed and the contactor F closed to connect the motor to the system, the accelerating currents are such as to exceed permissible values, the voltage regulator tube 8TU will break down and connect the control grid G of the control tube 3TU to the cathode thereof as described, introducing the current limit control which is effective to retard the firing angle of the main rectifiers. Inasmuch as the critical voltage which is applied to the tube 8TU is derived from that portion of the control grid circuit which carries current proportional to motor armature current, it will be seen that the effect of this control will be that of limiting the motor current to the maximum permissible value. Thus, the motor will be accelerated as rapidly as is permissible within the current limit setting of potentiometer 4P.

System damping is obtained by the anti-hunt potentiometer 9P, the tap of which is connected to the positive side of current limit potentiometer 4P by a capacitor 4C. During intervals when the rate of change of current is high this capacitor provides a low impedance path for current to flow from the tap of potentiometer 1AP which results in a voltage drop in potentiometer 9P tending to drive control grid G more positive and thereby limit conduction of the main rectifiers. When the current drops too rapidly, the discharge of this capacitor through the tapped portion of potentiometer 9P tends to make control grid G more positive to limit the rate of decrease of conduction of the main rectifiers.

Another control feature in the circuit of Fig. 1 is embodied in the use of a capacitor 2C connected in series with a resistor 5R between the plate P and control grid C of tube 3TU. The capacitor is shunted by the back contacts F1 of contactor F. When the contactor is closed contacts F1 open. During the first instant, corresponding to a few cycles of alternating current, condenser 2C is charging and at this time the voltage of grid C is highly positive. Consequently the main rectifier tubes pass very little, if any current during this starting interval which gives the previously described current limit control time to become effective. When contactor F is deenergized to stop the motor, capacitor 2C is shunted by contacts F1 and the bias on control grid C is again raised to prevent conduction of the main rectifiers.

In the system illustrated in Fig. 1, provision is made for extending the motor speed range beyond that obtainable by armature voltage variation alone, in an arrangement affording variable excitation of the separately excited or shunt field of the motor M in dependence of adjustment of the tap of the speed potentiometer 1P beyond a predetermined point in the direction of increasing speed. The circuit for accomplishing this control includes a pair of field voltage rectifier tubes of the gas-filled type, each of which comprises a control grid. These tubes are respectively designated 6TU and 7TU. The cathodes of these tubes are connected together and the respective plates are connected to opposite ends of a secondary winding 1TS2 of the main transformer 1T. The grid of the tube 6TU is controlled by a transformer 11T having a primary winding 11TP connected across a tapped portion of the secondary windings 1TS2. The secondary winding 11TS of this transformer forms part of a phase shift circuit including a capacitor 15C and a potentiometer 1BP which are connected in a series loop. The tap of potentiometer 1BP thus applies a voltage, shifted in phase with respect to the plate voltage of tube 6TU through a resistor 16R to the grid of this tube. The other field voltage control tube has the grid thereof connected to the plate through a biasing resistor 33R to provide the required degree of grid self-bias. This arrangement is such that upon the application of a voltage to the grid of tube 6TU to cause this tube to conduct, a voltage is applied to the motor shunt field SHF in a circuit which may be traced from the cathode of the tube 6TU, through the motor shunt field, through the main transformer secondary 1TS2 to the plate of tube 6TU to complete the field energizing circuit. On the next half cycle of alternating current, tube 6TU does not conduct due to the reversal of applied voltage thereacross. The tendency for the magnetic field of the shunt field winding to collapse results in an induced voltage thereacross which appears across the plate and cathode of the other field rectifier 7TU of the proper polarity. Since the biasing voltage of this tube is such as to cause the tube to fire upon the application of the proper voltage across the terminals of the tube, the tube 7TU now breaks down and conducts a current through the shunt field winding in the same direction as the current caused to flow therethrough by conduction of the tube 6TU. As a consequence, the motor field is maintained during this succeeding half cycle of alternating current and the process is then repeated with the next succeeding half cycle of alternating current.

The average value of the current in the motor shunt field winding depends upon the setting of the tap of potentiometer 1BP. It will be noted by an inspection of this potentiometer that a portion thereof is shunted by means of a jumper J1. This shunted portion of the potentiometer therefore provides a constant voltage range over which the tap thereof may operate, and over which a constant voltage is applied to the grid of field rectifier 6TU. This tapped section of the potentiometer 1BP corresponds to that portion of the potentiometer 1P over which speed variation of the motor is controlled by armature voltage variation and provides constant field excitation over the range of motor speed control obtained by armature voltage control. To this end a portion of the potentiometer 1P adjacent the end connected to the tap of potentiometer 3P, at which the maximum armature voltage is adjusted, is blanked by means of a jumper J2 so that movement of the tap of potentiometer 1P over this range introduces no voltage variation in the circuit of the control grid G of control tube 3TU. Thus, it will be appreciated that as the tap of potentiometer 1P is moved to the upper limit of the speed control setting by armature voltage variation, the tap of potentiometer 1BP approaches the end of the portion thereof blanked by the jumper J1 over which constant voltage is applied to the shunt field. Movement of the tap of speed potentiometer 1P further in the direction of increasing speed thereby results in movement of the speed setting tap into the constant voltage range blanked by the jumper J2, and further results in movement of the tap of potentiometer 1BP over the variable voltage portion thereof.

Thus, in this range the grid signal for the field rectifier 6TU is changed to properly control the excitation of the shunt field. In this instance, the control of tube 6TU is accomplished by shifting the phase of the signal applied to the grid thereof with respect to the plate voltage, and this is accomplished in the circuit illustrated by moving the tap of potentiometer 1BP over the unblanked portion to vary the amount of resistance in the grid circuit. The effect is such that as the tap of potentiometer 1BP is advanced into the unblanked range, the firing angle of the tube 6TU is progressively retarded. This has the effect of reducing the average current which is applied to the shunt field to cause weakening of this field and as a consequence increases the speed of the motor.

As earlier noted in this discussion, when the flux in the motor gap is reduced by weakening the shunt field excitation, the change in flux ($\Delta\phi$) becomes a much larger percentage of the total flux and major speed changes with increasing load may occur. It will be appreciated that linear circuits will not completely compensate for this non-linear effect. However, an approach toward correcting this non-linear condition may be achieved by utilizing a potentiometer such as 1BP which is non-linear in its unblanked range giving a non-linear adjustment of potentiometer 1AP.

From the foregoing considerations concerning Fig. 1, it will be appreciated that a control has been provided which introduces IR compensation as a function of speed in such degree as may be required to compensate the change in flux in the active air gap of the motor with changing armature current. The circuits which have been provided in Fig. 1 are relatively flexible and will afford compensation in substantially any degree within the rating of the system.

Figure 2:
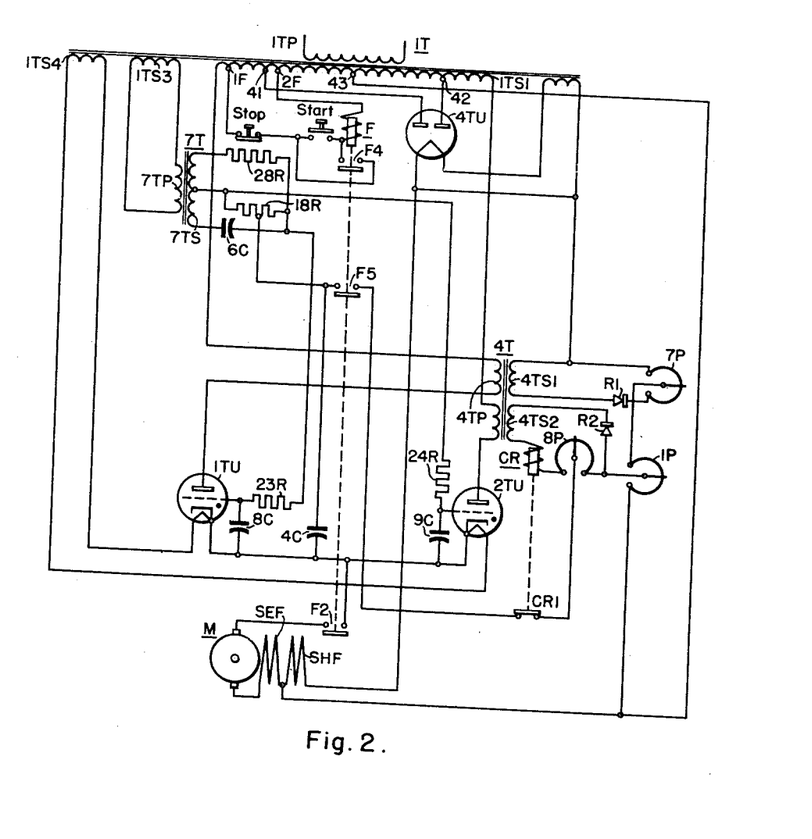
Fig. 2 is a schematic diagram illustrating a simplified embodiment of this invention.

Further investigation of this problem indicates that in general, a stable direct current motor will require a larger compensation signal at maximum speed than at the minimum speed in order to have good regulation. Consequently, it is possible to simplify the circuitry involving potentiometers such as 5P, 6P and 1AP in an arrangement affording an equally complete and satisfactory control of motor speed. An arrangement of this general nature is shown in Fig. 2, which in many respects is similar to Fig. 1 insofar as the main rectifying circuits are concerned. Consequently, parts in Fig. 2 corresponding to those in Fig. 1 bear like reference characters.

In Fig. 2 the main rectifiers 1TU and 2TU again control the energization of direct current motor M through circuit connections afforded by the main contactor F which in this instance, is energized by the voltage drop across the tapped portions 1F and 2F of transformer secondary 1TS1. The respective plates of main rectifiers 1TU and 2TU are connected in series with respective primaries, both designated 4TP, of transformer 4T to the opposite ends of the main secondary winding 1TS1. The control grids of the respective rectifiers are again controlled from a phase shift circuit, like that shown in Fig. 1, energized by a transformer 7T, the primary 7TP of which is energized by the output of the secondary winding 1TS2 of the main transformer. The filament circuits of the rectifiers are shown connected in series across another secondary winding 1TS4 of the main transformer. Any suitable expedient may be practiced for energizing the mentioned filaments. This portion of the circuit will be understood in connection with the explanations given with regard to Fig. 1.

The circuit for introducing the IR compensating voltages has been simplified in this illustration, in keeping with the aforesaid concept that the amount of compensation required at maximum speed will be at least equal to or greater than that which is required at minimum speed.

In this arrangement, the transformer 4T is provided with separate secondary windings 4TS1 and 4TS2. The output of transformer secondary 4TS1 is rectified by rectifier R1 and applied across a potentiometer 7P. Similarly, the output of secondary winding 4TS2 is reacted by rectifier R2 and applied across a potentiometer 8P. Although half wave rectification is shown, full wave rectification is easily obtained with bridge connected rectifiers and in some instances may be preferred. As potentiometers 8P and 7P are arranged in the present network, the setting of potentiometer 8P provides the minimum speed compensation voltage and the setting of potentiometer 7P provides the maximum speed compensation voltage. These potentiometers, as will be described, are arranged in a circuit including potentiometer 1P which directly controls the direct current bias superimposed on the A. C. grid signals applied to the control grids of the main rectifier tubes. In this application, field voltage for the motor field SHF is derived from a double-diode type of rectifier 4TU, the respective plates of which are connected to taps 41 and 42 of the main transformer secondary 1TS1. The cathode circuit of this tube includes the shunt field winding SHF and extends to a mid tap 43 on the secondary 1TS1 to complete the tube circuit. The grid circuit for the respective rectifiers is traceable from the common cathode circuit of the main rectifiers through the contact F2 of main contactor F through the armature winding of the motor M, which in this instance introduces the armature terminal voltage to the grid control circuit, through the series field SEF, through potentiometer 1P to the tap thereof, through the tapped portion of potentiometer 8P, through normally closed contacts CR1 of control relay CR which is load current responsive, through contacts F5 of the contactor F, to the tap of resistor 18R in the phase shift circuit and thence from the respective ends of resistor 18R to respective grid resistors 23R and 24R to the grids of the respective control tubes. The speed control potentiometer 1P is connected in a circuit across a tapped portion of potentiometer 7P and the shunt field winding SHF of the motor. This applies a predetermined portion of the potentiometer 7P, which is the maximum speed compensating potentiometer, in the circuit for the potentiometer 1P and consequently a voltage is introduced in the control grid circuit for the main rectifiers which varies in dependence of the setting of the tap of potentiometer 1P. Thus, when this tap is operated to effect a change in control bias of the main rectifiers to change motor speed, it will be appreciated that the amount of maximum speed IR compensation which is introduced in the grid circuit will be varied, hence, maximum speed compensation in this instance is a function of speed setting as in the case of Fig. 1.

The setting of the respective taps of potentiometers 7P and 8P is accomplished in a manner similar to that described in connection with Fig. 1, that is, with the tap of potentiometer 1P set in the low speed position, the tap of potentiometer is adjusted until the no-load speed and the full-load speed at minimum speed are the same. After this adjustment is made with the tap of potentiometer 1P at the high speed setting, the tap of potentiometer 7P is adjusted until the no-load and full-load speeds at maximum speed are essentially the same, which introduces the minimum speed and maximum speed compensation which is required. By reason of the connection of a tapped portion of potentiometer 7P in series with a tapped portion of potentiometer 1P, it will be appreciated that, in this instance, there will be no variation in minimum speed compensation with adjustment of the tap of potentiometer 1P. This is in keeping with the aforesaid concept of speed compensation, but at the same time due to the excitation of potentiometer 1P in part with the constant field voltage and in part with the maximum speed compensating IR voltage, the amount of IR compensation for maximum speed will be varied.

Figure 3:
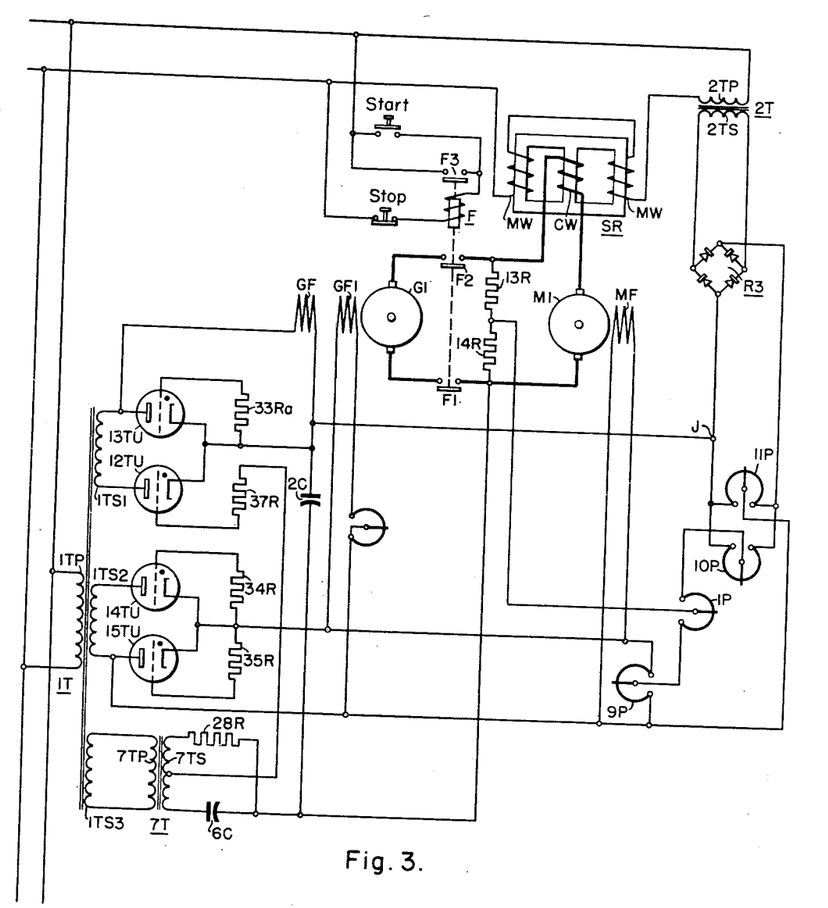
Fig. 3 is a schematic diagram of an application of this invention in a Ward-Leonard type of motor control system.

Further modifications of this system are evident in the arrangement illustrated in Fig. 3 illustrating the application of this invention in the control of a motor of a Ward-Leonard type of drive. In this arrangement, the armature winding of a motor M1 is connected in series with the armature winding of a generator G1 through the medium of the contacts F1 and F2 of a main contactor F.

The field winding for the generator G1 is variably excited in dependence of the setting of speed potentiometer 1P in a circuit including the rectifiers 12TU and 13TU.

The motor field winding MF is excited with a constant voltage from a circuit including the rectifiers 14TU and 15TU. Here again, as in the preceding embodiments of this invention, it is desired to compensate the control of the motor to minimize the speed error which exists due to the change in flux in the active air gap of the motor with motor armature current changes. The circuit network utilized herein, while similar in principle to those covered in the preceding embodiments, differs therefrom somewhat in detail in the manner in which excitation is applied to the several potentiometers comprising the network. These details will be covered at a later point in the description.

The circuit for energizing the rectifiers 12TU and 13TU is similar to that used in connection with the rectifiers 6TU and 7TU of Fig. 1 which in that instance were utilized to control the excitation of the motor shunt field. In this arrangement, a main transformer IT having a primary ITP, adapted for connection to a suitable alternating current supply, is the primary source of energy for the control components of the system. A secondary winding ITSI of this transformer has the respective end points thereof connected to the respective plates of tubes 12TU and 13TU which are utilized to excite the generator field GF. The generator field winding GF is connected between the plate of tube 13TU and the common cathode circuit between the two tubes. The grid of tube 13TU is self-biased by means of a resistor 33R so that upon the application of proper voltage across the plate and cathode of this tube, the tube will fire and conduct current over that half cycle of alternating current. The grid of the tube 12TU is controlled by means of a phase shift circuit comprising resistor 28R and capacitor 6C connected across the end points of a secondary winding ITS of transformer IT, the primary winding of which is connected to a secondary winding ITS3 of the main power supply transformer.

The function of the tubes 12TU and 13TU in energizing the generator field may be briefly described at this stage as follows: When the instantaneous polarity of the secondary voltage of secondary winding ITSI, appearing across the plate and cathode of tube 12TU, is of proper polarity for conduction of the tube and, if at that instant, a grid signal is applied to the grid of this tube such that firing of the tube may take place, current is caused to flow through the generator field winding GF during that portion of the half cycle of alternating current over which the control grid has initiated firing. When the instantaneous polarity of the alternating current reverses in the next half cycle, tube 12TU ceases to conduct. The induced voltage of the generator field winding due to its collapsing magnetic field applies a voltage of proper polarity across the other tube 13TU which is self-biased to conduct over a predetermined portion of a given half cycle of alternating current. As a consequence, tube 13TU becomes conducting and a current is caused to flow through the generator field GF in the same direction as that introduced by conduction of the tube 12TU. Consequently, the excitation of generator field is maintained in that half cycle of alternating current in which the tube 12TU is nonconducting.

The control afforded of motor field excitation by the tubes 14TU and 15TU is similar to that described above. In this instance, however, both of the tubes 14TU and 15TU are self-biased by grid resistors 34R and 35R respectively. Firing of tube 14TU is initiated by the application of voltage by the secondary winding ITS2 across the plate and cathode of that tube of the proper polarity. This tube then conducts over that portion of this half cycle of alternating current voltage as determined by the fixed bias of its grid. During the next half cycle, the tube 14TU ceases to conduct. The magnetic field of the motor field winding tends to collapse and the induced voltage of the field winding appearing across the tube 15TU is of such polarity as to cause this tube to fire over that portion of this induced voltage pulse as determined by the fixed bias of the grid of this tube. Consequently, the motor field is energized during the non-conducting period of tube 14TU which corresponds to the other half cycle of alternating current.

The compensating network comprises a maximum speed compensating potentiometer 9P which is excited by the output of the tubes 14TU and 15TU in parallel with the motor field MF. The potentiometers 10P and 11P are connected in parallel across the output terminals of a full-wave bridge type rectifier R3. This rectifier R3 is energized by the output of the secondary winding 2TS of a transformer 2T, the primary winding 2TP of which is connected to a supply of alternating current through the main winding MW of a saturable reactor SR. A control winding CW of this saturable reactor is connected in series in the motor generator armature circuit to be energized in dependence of motor current.

As is well-known, the impedance of such a saturable reactor is variable in dependence of the magnitude of control winding excitation, being maximum when the control winding excitation is zero and being a lesser value in direct proportion to the increasing excitation of the control winding. With this arrangement, as the motor current increases, the impedance of the main winding in series with the primary 2TP will decrease and consequently a current is caused to flow in the primary 2TP which is proportional to the motor armature current. This voltage, which is reflected in the secondary winding 2TS and rectified in rectifier R3, is applied across the terminals of the respective potentiometers 10P and 11P to provide excitation of these potentiometers in dependence of motor current.

The motor speed potentiometer 1P has one end thereof connected to the tap of potentiometer 9P and the other end thereof connected to the tap of potentiometer 10P. Thus, with this circuit the potentiometer 9P introduces a constant voltage into the circuit of potentiometer 1P which corresponds, for example, to the voltage applied across potentiometer 1P in Fig. 1 between the taps of potentiometers 2P and 3P. The setting of the tap of potentiometer 10P may be in accordance with the maximum speed compensation setting described, for example, in connection with potentiometer 5P of Fig. 1 while the setting of tap of potentiometer 11P may be in accordance with the minimum speed compensation setting as described in connection with potentiometer 6P in Fig. 1. Thus, there is introduced across the potentiometer 1P an additional voltage which corresponds to the degree of IR compensation required for any setting of the tap of the potentiometer to obtain variable motor speed.

The remaining portion of this circuit is represented in the voltage divider comprising resistors 13R and 14R connected in series across the motor armature terminals, the resistor 14R by reason of the circuit connections being included in the grid circuit. Hence, a voltage proportional to motor armature terminal voltage also appears in the circuit for controlling the grid of tube 12TU.

This grid circuit may be traced from the grid of tube 12TU through grid bias resistor 37R to the center tap of secondary winding ITS, thence through the parallel branches of the phase shift circuit to one terminal of resistor 14R, through resistor 14R to the tap of potentiometer 1P, through a tapped portion thereof to the tap of potentiometer 10P, through a tapped portion of potentiometer 10P to the junction J and to the cathode of the tube 12TU. In this arrangement, when the tapped voltage of the speed potentiometer 1P which appears in the grid circuit is increased in magnitude, the firing angle of the tube 12TU is advanced to cause this tube to conduct current over a greater portion of its conducting half cycle of alternating current. As a consequence, the excitation of the generator field winding is increased which therefore increases the voltage which is applied to the motor and tends to increase the speed of the motor.

It will be appreciated that numerous control expedients which are conventionally incorporated in such systems of control when reduced to practice, have not been illustrated in this embodiment of the invention in the interest of simplicity. However, it is believed within the capacity of one skilled in the art to make such necessary additions in the way of overload control, reversing features, and etc. to successfully practice the present invention.

Although several embodiments of this invention have been illustrated herein, it will be appreciated by those skilled in the art that these principles may be practiced with other apparatus both with regard to the specific network for generating the several voltages and with regard to the system components which are controlled by these voltages and that other circuit arrangements may be effected in keeping with these principles for achieving essentially the same results. Accordingly, it is intended that the foregoing disclosure and the showings made in the drawings shall be considered only as illustrative of the principles of this invention and not interpreted in a limiting sense.

We claim as our invention:

1. In a system of control for a direct current motor, the combination of first adjustable circuit means for producing a reference voltage representative of a given motor speed, second circuit means connected across the motor armature for producing a voltage proportional to motor armature terminal voltage, third circuit means responsive to motor current for producing a voltage proportional to the motor current, fourth adjustable circuit means energized in dependence of motor current and adjusted with said first circuit means for producing a voltage representative of selected values of motor speed and armature current, a network differentially connecting said third and said fourth circuit means with respect to said second circuit means and differentially connecting said second circuit means with said first circuit means, and control means responsive to the output of said network for controlling said motor.

2. In a system of control for a direct current motor, the combination of, first circuit means for producing a reference voltage representative of a selected motor speed, second circuit means connected across the motor armature for producing a voltage proportional to motor armature terminal voltage, third circuit means responsive to motor current for producing a voltage proportional to the motor current, fourth adjustable circuit means energized in dependence of motor current and adjustable with said first circuit means for producing a voltage representative of selected values of motor speed, a network differentially connecting said third and said fourth circuit means with respect to said second circuit means and differentially connecting said second circuit means with said first circuit means, control means responsive to the output of said network for controlling said motor, and mechanically connected adjustable impedance means in each of said first and said fourth circuit means for simultaneously varying the voltages of said first and said fourth circuit means.

3. In a speed control system for a direct current motor, the combination of, an electrical network comprising a pair of impedance devices, circuit connections for energizing said impedance devices in dependence of motor load current, adjustable potentiometer means forming a part of said network, said potentiometer means being connected with both of said impedance devices, circuit connections for applying a constant voltage to at least a portion of said potentiometer means, circuit means responsive to motor armature voltage for applying a voltage to said network, the output of said network being variable in dependence of adjustment of said potentiometer means, and control means responsive to the output of said network for controlling said motor.

4. In a control system for controlling the speed of a direct current motor, the combination of, control means for controlling the energization of said motor, an electrical network connected to said control means to control said control means, adjustable potentiometer means forming a part of said network, circuit means forming part of said network and responsive to motor current for applying a first voltage to said potentiometer means corresponding to load current at minimum motor speed, circuit means forming part of said network and responsive to motor current for applying a second voltage to said potentiometer means corresponding to load current at maximum motor speed, circuit means for applying a substantially constant voltage to said network, and circuit means responsive to motor armature voltage for applying a voltage to said network.

5. In a system for controlling the speed of a motor, control means for controlling the energization of the motor, a control circuit for controlling the control means, first circuit means in said control circuit responsive to motor armature voltage for introducing a first voltage in said control circuit proportional to motor armature voltage, second circuit means in said control circuit responsive to motor current for introducing a voltage in said control circuit in opposition to said first named voltage, third circuit means in said control circuit responsive to motor current for introducing a voltage in said control circuit in opposition to said first named voltage, and means for adjusting said last named voltage in dependence of motor speed.

6. A motor speed regulator comprising, control means for controlling energization of the motor, and impedance device adapted for energization in dependence of motor armature voltage, adjustable impedance means adapted for energization in dependence of motor current, said adjustable impedance means being adjusted to provide a flat speed-load characteristic for the motor, circuit connections for applying a constant voltage to said adjustable impedance means, circuit means differentially connecting said adjustable impedance means and said impedance device to control said control means, said adjustable impedance means being further adjustable to control the speed of said motor.

7. A motor speed regulator comprising, circuit means for producing a voltage corresponding to motor armature terminal voltage, circuit means for producing a voltage corresponding to IR compensation at maximum motor speed, circuit means for producing a voltage corresponding to IR compensation at minimum motor speed, adjustable means for producing a voltage corresponding to a desired motor speed, circuit means combining the first named of said voltages in a differential sense with the remaining voltages, and control means for the motor connected with said last named circuit means to be controlled thereby.

8. A motor speed regulator comprising, a first circuit responsive to motor armature voltage for producing a voltage, a second circuit responsive to motor armature current for producing a second voltage, a third circuit responsive to motor current and having an adjustment therein for producing an adjustable voltage, a speed reference voltage circuit having an adjustment for varying the speed reference voltage, means for simultaneously adjusting said third circuit and said speed reference voltage circuit, and circuit means differentially combining the first named voltage with the remainder of said voltages for producing a control voltage for controlling the motor.

9. An impedance circuit for controlling the speed of a motor comprising, a first impedance device adapted for energization in dependence of motor armature voltage, a pair of impedance devices adapted for energization in dependence of motor current, adjustable impedance means energized in dependence of predetermined portions of the respective voltages of said pair of impedance devices and adapted for energization in dependence of a constant voltage, circuit means differentially connecting said first impedance device with respect to the remainder of said impedances, and control means for controlling energization of the motor, connected with said circuit means to be controlled thereby.

10. An impedance circuit for controlling the speed of a motor comprising, a first impedance device adapted for energization in dependence of motor armature voltage, at least one impedance device adapted for energization in dependence of motor current, adjustable impedance means energized in dependence of a predetermined portion of the voltage of said one impedance device, and adapted for energization in dependence of a constant voltage, circuit means differentially connecting said first impedance device with the remainder of said impedances, and control means for controlling energization of the motor, connected with said circuit means to be controlled thereby.

11. An impedance circuit for controlling the speed of a motor comprising, a first impedance device adapted for energization in dependence of motor armature voltage, a pair of impedance devices adapted for energization in dependence of motor current, an adjustable impedance device connected between respective taps on each of said pair of impedance devices, an adjustable motor speed controlling impedance device adapted for energization in dependence of a constant voltage, means for simultaneously adjusting said adjustable impedance and said adjustable motor speed controlling impedance, circuit means differentially connecting said first impedance device with the remainder of said impedance devices, and control means for controlling motor speed connected with said circuit means to be controlled thereby.

12. A potentiometer circuit for controlling the speed of a motor comprising, resistance means adapted for connection across the armature of the motor, a pair of parallel connected adjustable tap potentiometers adapted for energization in dependence of motor current, an adjustable tap compensating potentiometer connected between the respective taps of said pair of potentiometers, a speed controlling potentiometer adapted for connection to a supply of constant voltage, means mechanically connecting the taps of the compensating and speed potentiometer, a circuit connecting said resistance means to the taps of the compensating and speed potentiometers, and motor control means having a control circuit connected between a common point of said parallel connected potentiometer and a point on said speed potentiometer.

13. A potentiometer circuit for controlling the speed of a motor comprising, a pair of adjustable tap potentiometers adapted for energization in dependence of motor current, an adjustable tap, speed controlling potentiometer, a circuit including a tapped portion of each of said pair of adjustable potentiometers and a tapped portion of said speed controlling potentiometer, circuit connections for applying a constant voltage across said speed potentiometer, circuit connections for applying a voltage corresponding to motor armature terminal voltage in said circuit, and control means connected in said terminal voltage in said circuit, and control means connected in said circuit to be controlled thereby for controlling said motor.

14. A potentiometer circuit for controlling the speed of a motor comprising, a pair of adjustable tap potentiometers adapted for energization in dependence of motor current, a speed controlling potentiometer adapted for energization with a constant voltage, a circuit connecting a tapped portion of one of said pair of potentiometers, a tapped portion of said speed potentiometer and a tapped portion of the other of said pair of potentiometers in series aiding relation; means for applying a voltage corresponding to motor armature terminal voltage in opposition in said circuit, and control means connected to said circuit to be controlled thereby for controlling the motor.

15. A potentiometer circuit for controlling the speed of a motor comprising, at least one adjustable tap potentiometer adapted for energization in dependence of motor current, a second adjustable tap potentiometer adapted for energization with essentially constant voltage, an adjustable tap, speed controlling potentiometer having its ends connected between the taps of said one and said second potentiometers; a circuit for applying a voltage corresponding to motor armature voltage in opposition to the tapped voltage of said speed potentiometer, and means responsive to the output voltage of said circuit for controlling the motor.

16. A potentiometer circuit for controlling the speed of a motor comprising, a pair of parallel connected, adjustable tap potentiometers adapted for energization in dependence of motor current, a third adjustable tap potentiometer adapted for energization with essentially constant voltage, an adjustable tap, speed controlling potentiometer, a circuit connecting said speed potentiometer in series with a tapped portion of said third potentiometer between the respective taps of said pair of potentiometers, circuit means for producing a voltage corresponding to motor armature voltage, a control circuit differentially combining the tapped voltage of said speed potentiometer and the voltage of said circuit means, and control means responsive to the difference of said last named voltages for controlling said motor.

17. An impedance circuit for controlling the speed of a motor comprising, three series connected impedances, circuit connections for applying a constant voltage across the series impedances, circuit connections for applying a voltage corresponding to motor armature current across two adjacent impedances, a speed control potentiometer having an adjustable tap, the end points of said speed potentiometer being respectively connected between said adjacent impedances and to a tap on the remaining impedance, circuit means for producing a voltage corresponding to motor armature voltage, a control circuit differentially combining the voltage of said circuit means with the tapped voltage of said speed control potentiometer, and control means responsive to the difference of said last named voltages for controlling the speed of said motor.

18. An impedance circuit for controlling the speed of a motor comprising, three series connected impedances, circuit connections for applying a substantially constant voltage across said impedances, circuit connections for applying a voltage across two adjacent impedances in dependence of motor armature current, an adjustable tap, speed control potentiometer having the end points thereof connected to respective taps on the outer two of said three impedances, circuit means for producing a voltage corresponding to motor armature voltage, a control circuit for differentially combining the voltage of said circuit means with the tapped voltage of said speed potentiometer, and means responsive to the difference of said last named voltages for controlling said motor.

No references cited.